US009851756B2

United States Patent
Bostick et al.

(10) Patent No.: US 9,851,756 B2
(45) Date of Patent: Dec. 26, 2017

(54) RECOMMENDING BENDING LINES ON FLEXIBLE DISPLAYS

(71) Applicant: International Business Machines Corporation, Armonk, NY (US)

(72) Inventors: James E. Bostick, Cedar Park, TX (US); Hernan A. Cunico, Holly Springs, NC (US); John M. Ganci, Jr., Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 14/662,310

(22) Filed: Mar. 19, 2015

(65) Prior Publication Data

US 2016/0275774 A1 Sep. 22, 2016

(51) Int. Cl.
| | |
|---|---|
| *G06F 1/16* | (2006.01) |
| *G06F 3/01* | (2006.01) |
| *G06F 3/0481* | (2013.01) |
| *G09G 3/20* | (2006.01) |
| *G09G 5/14* | (2006.01) |
| *H04M 1/02* | (2006.01) |

(52) U.S. Cl.
CPC .......... *G06F 1/1652* (2013.01); *G06F 1/1626* (2013.01); *G06F 1/1694* (2013.01); *G06F 3/017* (2013.01); *G06F 3/04817* (2013.01); *G09G 3/20* (2013.01); *G06F 1/1641* (2013.01); *G06F 2203/04102* (2013.01); *G09G 5/14* (2013.01); *G09G 2320/043* (2013.01); *G09G 2380/02* (2013.01); *H04M 1/0268* (2013.01)

(58) Field of Classification Search
CPC ......... G06F 1/1652; G06F 2203/04102; G06F 1/1641; G06F 3/016; G09G 2380/02; G09G 5/14; H04M 1/0268
USPC .................................... 345/31, 647; 340/665
See application file for complete search history.

(56) References Cited

U.S. PATENT DOCUMENTS

| | | | |
|---|---|---|---|
| 8,068,886 B2 | 11/2011 | Vartanian | |
| 8,587,539 B2 | 11/2013 | Tziortzis et al. | |
| 9,007,226 B2 | 4/2015 | Chang | |
| 2006/0206215 A1 | 9/2006 | Clausen et al. | |
| 2010/0011291 A1 | 1/2010 | Nurmi | |
| 2010/0053068 A1 | 3/2010 | Cohen | |
| 2012/0235894 A1* | 9/2012 | Phillips | G09G 3/36 345/156 |

(Continued)

FOREIGN PATENT DOCUMENTS

| | | |
|---|---|---|
| JP | 2006330082 A | 12/2006 |
| WO | 2014027796 A1 | 2/2014 |

*Primary Examiner* — Benyam Haile
(74) *Attorney, Agent, or Firm* — Alexa L. Ashworth; Brian M. Restauro

(57) ABSTRACT

Embodiments of the present invention provide a method and system for recommending one or more bend lines in a flexible display to distribute a bending load on the flexible display. According to one embodiment, one or more bend lines are detected in a display, and data from the bend lines is obtained and stored. The data is compared to a pre-determined manufacturer bending threshold of the display, and the system determines whether one or more bends in the display have exceeded the pre-determined manufacturer bending threshold. When the threshold has been exceeded, an alert is created and sent to a user of the device.

17 Claims, 3 Drawing Sheets

(56) References Cited

U.S. PATENT DOCUMENTS

| | | |
|---|---|---|
| 2013/0100037 A1 | 4/2013 | Mabie et al. |
| 2013/0135244 A1 | 5/2013 | Lynch et al. |
| 2013/0215088 A1 | 8/2013 | Son et al. |
| 2013/0265260 A1* | 10/2013 | Seo .................. G06F 3/041 345/173 |
| 2014/0049463 A1* | 2/2014 | Seo .................. G06F 3/0487 345/156 |
| 2014/0320437 A1 | 10/2014 | Kang |

* cited by examiner

RECOMMENDING BENDING LINES ON FLEXIBLE DISPLAYS

BACKGROUND OF THE INVENTION

The present invention relates generally to the field of flexible display devices, and more particularly to recommending bending lines on flexible display devices based on the bend history data.

Flexible and transparent displays are becoming more and more widespread and may be useful options for smart devices, such as laptops, tablets, mobile phones, and other display devices. Flexible displays allow a user to bend and fold a device display at different locations. Over time, the display material may be affected by stress and fatigue from repeated and continuous folding by a user in different directions and along similar folding lines.

SUMMARY

According to one embodiment of the present invention, a method for recommending one or more bend lines in a flexible display is provided. The method may include: receiving, by one or more processors, a plurality of data associated with one or more bends in a display; comparing, by one or more processors, the plurality of data associated with the one or more bends in the display to a set of historical bend data and a bending threshold of the display; determining, by one or more processors, whether the one or more bends in the display have exceeded the bending threshold of the display; and responsive to determining that the one or more bends in the display has exceeded the bending threshold of the display, sending, by one or more processors, an alert associated with the bending threshold.

Another embodiment of the present invention provides a computer program product for recommending one or more bend lines in a flexible display, based on the method described above.

Another embodiment of the present invention provides a computer system for recommending one or more bend lines in a flexible display, based on the method described above.

DETAILED DESCRIPTION

Flexible displays allow a user to bend and fold a device display, however, the display composition material may be affected by stress and fatigue from repeated and continuous folding by a user in different directions and along similar folding lines. Embodiments of the present invention provide methods and systems for extending the life of a flexible display by dynamically recommending bending lines on the device display based on historical bending data and a display bending threshold limit.

Figure 1:
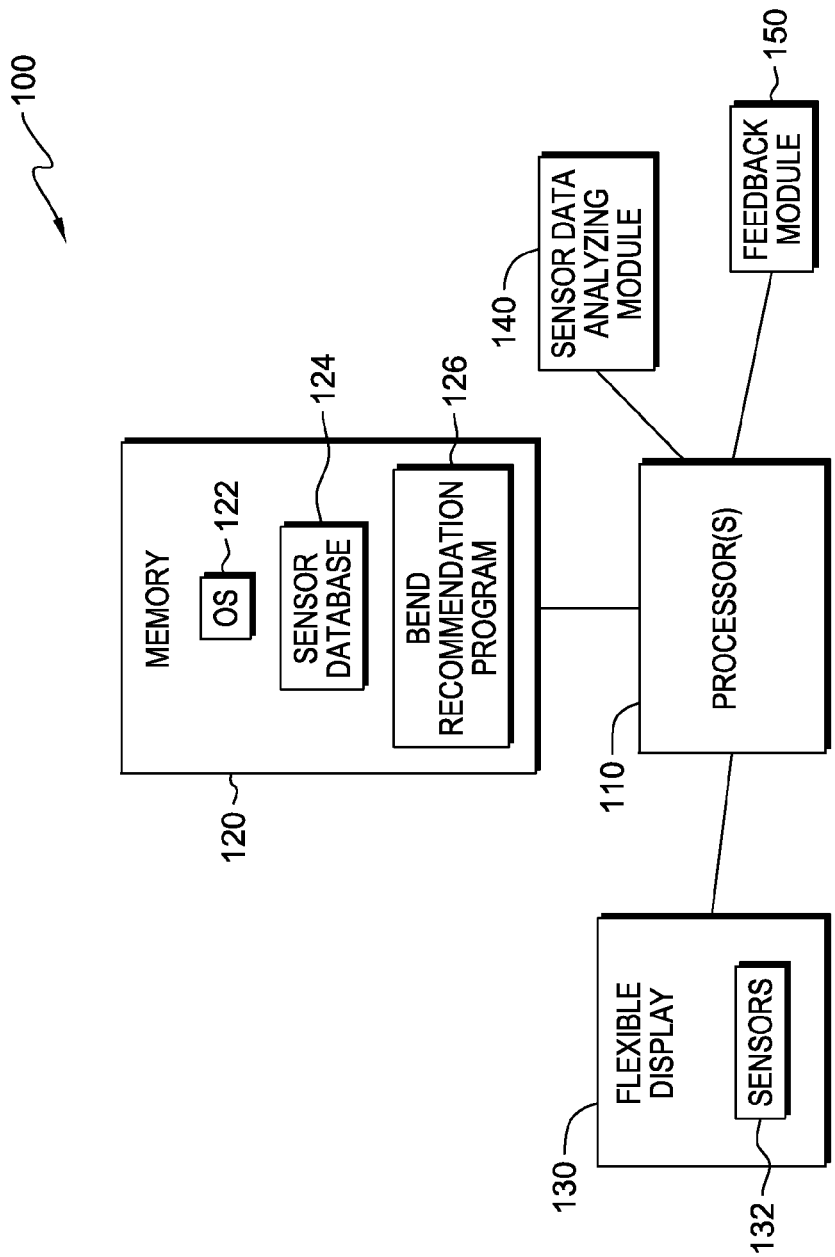
FIG. 1 depicts a functional block diagram of a computing device, in accordance with an embodiment of the present invention.

The present invention will now be described in detail with reference to the Figures. FIG. 1 depicts a functional block diagram illustrating a computing device, generally designated 100, in accordance with an embodiment of the present invention. Modifications to computing device 100 may be made by those skilled in the art without departing from the scope of the invention as recited by the claims. In an exemplary embodiment, computing device 100 includes one or more processor(s) 110, memory 120, flexible display 130, sensor data analyzing module 140, and feedback module 150. Computing device 100 may be any electronic device capable of being implemented with a flexible display, including, but not limited to, personal data organizers, handheld gaming platforms, cameras, mobile devices, and tablets.

Memory 120 includes operating system (OS) 122, sensor database 124, and bend recommendation program 126. Memory 120 may include any suitable volatile or non-volatile computer readable storage media, and may include random access memory (RAM) and cache memory (not depicted in FIG. 1). Bend recommendation program 126 may be stored in a persistent storage component (not depicted) for execution and/or access by one or more of processor(s) 110 via one or more memories of memory 120. Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information.

Sensor database 124 is a repository for data received from sensors 132. Sensor database 124 stores the received sensor data, including display bend lines, bend radii, bend angles, bend durations, and bend frequencies, as well as, the pre-determined device bending thresholds. Sensor database 124 may be accessed by sensor data analyzing module 140 and feedback module 150.

OS 122 is software which is executed by one or more processor(s) 110. OS 122 manages memory 120 and the software contained therein. In this exemplary embodiment, OS 122 is integrated with bend recommendation program 126. In other embodiments, bend recommendation application 126 may operate as a separate software program or application from OS 122.

Bend recommendation program 126 uses historical bending data from sensor database 124, which has been extrapolated and analyzed by sensor data analyzing module 140, and proposes one or more bend lines to a user through flexible display 130, which are recommended to preserve the material of the flexible display. The proposed bend line(s) may be a visual indication to a user of where to bend the device display in flexible display 130.

Flexible display 130 includes sensors 132. Flexible display 130 is capable of displaying images generated by a computing device. Flexible display 130 may be any suitable flexible display, such as an organic light-emitting diode (OLED) display, and may include touch-sensing capabilities. Flexible display 130 may include a pre-determined bending threshold angle based on the device (i.e., different devices may have different bending threshold angles).

Sensors 132 are installed in the registers (not depicted in FIG. 1) of flexible display 130 and detect information about where the display is bent including: the direction, the bending radius, the duration of each bend, and the frequency of each bend, among other information.

Sensor data analyzing module 140 analyzes sensor data accessed from sensor database 124 and extrapolates the data, along with the display manufacturer specifications and/or thresholds.

Feedback module 150 communicates to a user when flexible display 130 is being bent at, or beyond, a particular threshold limit. Feedback module 150 may include visual, audio, and/or haptic feedback sensors to display and/or transmit an alert to a user when a flexible display is bent beyond a threshold limit.

Figure 2:
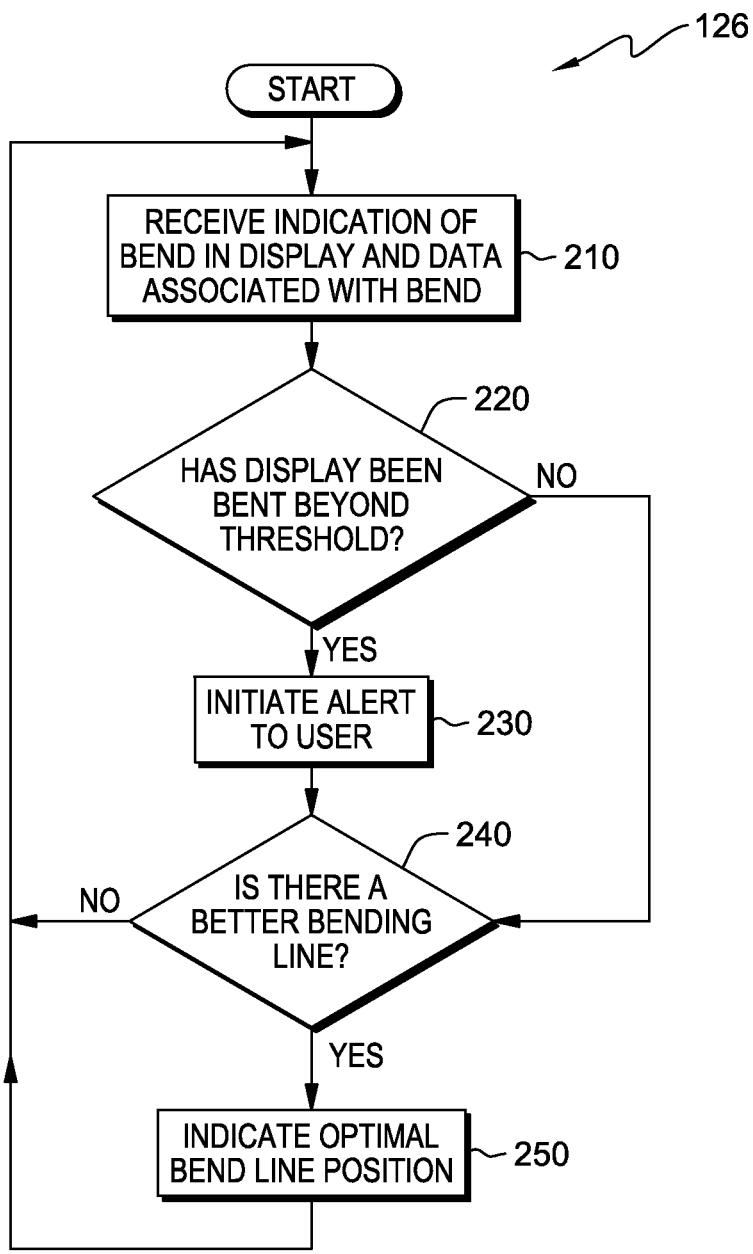
FIG. 2 depicts a flowchart illustrating operational steps for determining and recommending an optimal bending line on a flexible display device, in accordance with an embodiment of the present invention.

FIG. 2 depicts a flowchart illustrating operational steps of bend recommendation program 126 for determining and recommending an optimal bending line on a flexible display device, in accordance with an embodiment of the present invention.

In step 210, bend recommendation program 126 receives an indication from sensors 132 that there is a bend in flexible display 130 and receives the sensor data associated with the display bend. In this exemplary embodiment, sensors 132 in flexible device 130 detect movements associated with a display bend (i.e., direction, radius, location, and duration) and send the raw sensor data to sensor database 124. Sensor data analyzing module 140 accesses the raw sensor data and analyzes the sensor data, subsequently sending the analyzed data metrics to sensor database 124, where the data is stored and may be subsequently accessed. In another embodiment, bend recommendation program 126 makes a specific bend line request or a service request to OS 122 about a desired bend line (i.e., the display is not yet bent at the line, but may be in the future). The request may include, for example, parameters about the location of the desired bend line (e.g., desired bend within a certain range). In yet another embodiment, bend recommendation program 126 receives an indication from sensors 132 that there is more than one bend in flexible display 130 and receives the raw sensor data associated with each display bend.

In step 220, bend recommendation program 126 determines whether flexible display 130 has been bent beyond a threshold angle. In this exemplary embodiment, bend recommendation program 126 compares the gathered raw sensor data from the bend in the display to manufacturer specifications and/or thresholds (e.g., maximum bending angles) for the particular device. The manufacturer specifications are stored in sensor database 124 and may be accessed by bend recommendation program 126 in order to compare the device threshold information to the received raw sensor data associated with the display bend.

If, in step 220, bend recommendation program 126 determines that flexible display 130 has been bent beyond the threshold angle, then, in step 230, bend recommendation program 126 initiates an alert to the user. In this exemplary embodiment, bend recommendation program 126 initiates feedback module 150 to alert a user of a display bend which is beyond the threshold angle, through an interface of flexible display 130. The alert to the user may be, for example, a visual alert (e.g., color gradients, animation, lights), an audio alert (e.g., particular sounds or sound patterns), and/or a haptic alert (e.g., vibrations from the device).

If, in step 220, bend recommendation program 126 determines that flexible display 130 has not been bent beyond the threshold angle, then, in step 240, bend recommendation program 126 determines whether there is a better (i.e., optimal) bending line in flexible display 130 than the current or anticipated bending line. In this exemplary embodiment, bend recommendation program 126 compares the received bend data and parameters associated with applications within the display to the historical bending information stored in sensor database 124 to determine if a better bending line exists. For example, bend recommendation program 126 may take into account historical bend data, as well as, parameters associated with an auto racing game running on the device when comparing the historical data to determine a better bending line than the current or anticipated bending line. Bend recommendation program 126 may use the location of obstacles associated with the auto racing game to determine the optimal bending line (i.e., determine a line on the display which does not intersect through a display component of the game).

If, in step 240, bend recommendation program 126 determines that there is a better bending line, then, in step 250, bend recommendation program 126 indicates the determined optimal bend line position. In this exemplary embodiment, bend recommendation program 126 indicates an optimal bend line position to a user through a visual effect (i.e., animation, lights, etc.). For example, when a display is bent over the same line multiple times, bend recommendation program 126 may visually recommend a different bend line within the display, in order to extend the life of the display.

If, in step 240, bend recommendation program 126 determines that there is not a better bending line, then, the program continues to monitor for an indication that a new bend in the display is received (step 210). In other embodiments, the operational steps of FIG. 2 described above are implemented with a flexible display in which there is more than one bend line detected within flexible display 130.

Accordingly, by performing the operational steps of FIG. 2, the life of a flexible display can be increased by notifying a user of an optimal line and angle at which to bend a display in order to better distribute the bending load on the display. By repeatedly performing the operational steps of FIG. 2, a user can be notified of the optimal bend line(s) of a particular flexible display device in real-time.

Figure 3A:
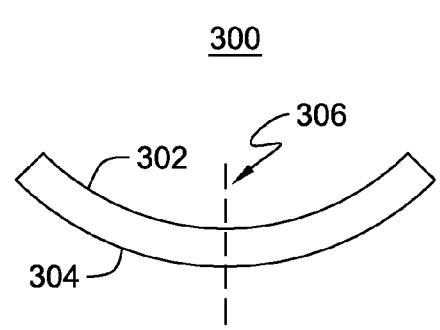
FIGS. 3A and 3B depict a cross-sectional and plan view, respectively, of an example of a historical bending line, in accordance with an embodiment of the present invention.
Figure 3B:
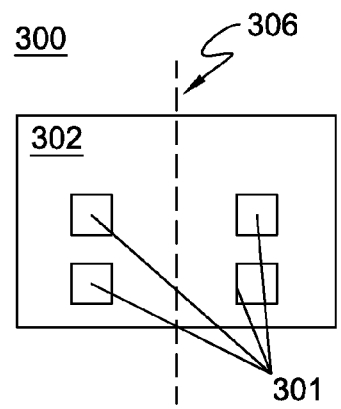

FIGS. 3A and 3B depict a cross-sectional and plan view, respectively, of an example of a historical bending line, in accordance with an embodiment of the present invention. For simplicity, FIGS. 3A-F depict one bend line in a flexible display, however, it is to be understood that the devices of FIGS. 3A-F may be implemented with one or more bend lines in the flexible display.

FIG. 3A depicts a cross-sectional view of FIG. 3B, taken perpendicular to historical bending line 306. Device 300 includes top surface 302 and bottom surface 304 and is bent at historical bending line 306. FIG. 3B depicts a plan view of historical bending line 306 of device 300. In FIG. 3B, icons 301 are visible on top surface 302 of device 300 and are distributed within the display relative to historical bending line 306 so that historical bending line 306 does not intersect through any of icons 301 (i.e., icons 301 are located farther from historical bending line 306 within the display for the best visibility and functionality to a user).

Figure 3C:
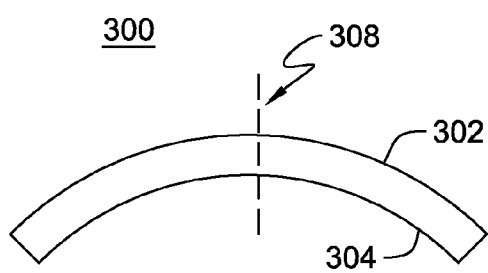
FIGS. 3C and 3D depict a cross-sectional and plan view, respectively, of an example of another historical bending line, in accordance with an embodiment of the present invention.
Figure 3D:
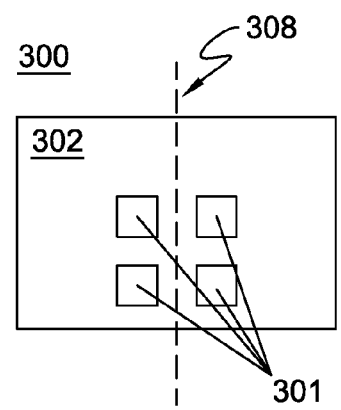

FIGS. 3C and 3D depict a cross-sectional and plan view, respectively, of an example of another historical bending line, in accordance with an embodiment of the present invention.

FIG. 3C depicts a cross-sectional view of FIG. 3D, taken perpendicular to historical bending line 308. Device 300 includes top surface 302 and bottom surface 304 and is bent at historical bending line 308. In this embodiment, historical bending line 308 is located in the same position of device 300 as historical bending line 306 of FIGS. 3A and 3B, however, device 300 of FIGS. 3C and 3D is bent in the opposite direction of the bend angle of FIGS. 3A and 3B. In FIG. 3D, icons 301 are visible on top surface 302 of device 300 and are relocated within the display relative to historical bending line 308 (i.e., icons 301 are located closer to historical bending line 308 within the display for the best visibility and functionality to a user).

Figure 3E:
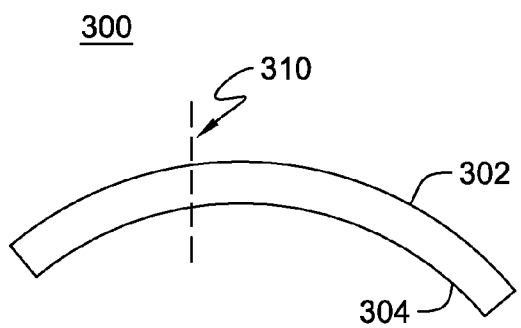
FIGS. 3E and 3F depict a cross-sectional and plan view, respectively, of an example of a recommended bending line, in accordance with an embodiment of the present invention.
Figure 3F:
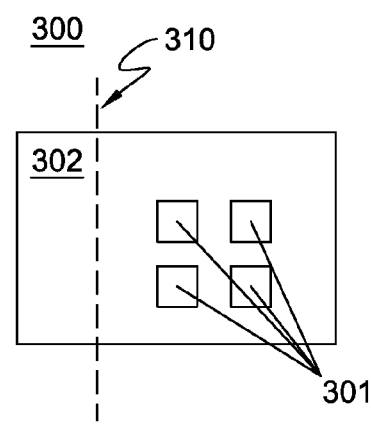

FIGS. 3E and 3F depict a cross-sectional and plan view, respectively, of an example of a recommended bending line, in accordance with an embodiment of the present invention.

FIG. 3E depicts a cross-sectional view of FIG. 3F, taken perpendicular to recommended bending line 310. Device 300 includes top surface 302 and bottom surface 304 and is bent at recommended bending line 310. In this embodiment, recommended bending line 310 is at a different location than historical bending lines 306 (FIGS. 3A and 3B) and 308 (FIGS. 3C and 3D), in order to extend the life of the display. In FIG. 3F, icons 301 are visible on top surface 302 of device 300 and are relocated within the display relative to recommended bending line 310 (i.e., icons 301 are located on the side of the display that is opposite to recommended bending line 310 for the best visibility and functionality to a user).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for recommending one or more bend lines in a flexible display, the method comprising:
   receiving, by one or more processors, a plurality of data associated with one or more bends in a display;
   comparing, by the one or more processors, the plurality of data associated with the one or more bends in the display to a set of historical bend data and a bending threshold of the display;
   determining, by the one or more processors, whether the one or more bends in the display have exceeded the bending threshold of the display;
   responsive to determining that the one or more bends in the display has exceeded the bending threshold of the display, sending, by the one or more processors, an alert associated with the bending threshold; and
   determining, by the one or more processors, an optimal bending line in the display alternative to a detected bend in the display based on applications running on the display, and historical data, wherein:
      the optimal bending line is determined based on a comparison of an existing location of items associated with respective applications running on the display and the detected bend in the display such that the optimal bending line is alternative to the detected bend that conflicts with components of the displayed application running on the display, and
      wherein the historical data accounts for a direction, a bending radius, a duration of each bend line and a frequency of each bend line; and
   responsive to determining the optimal bending line in the display, indicating, by the one or more processors, the optimal bending line in the display.

2. The method of claim 1, wherein determining an optimal bending line in the display comprises:
   analyzing, by the one or more processors, the set of historical bend data, the bending threshold of the display, and a set of parameters associated with the bending line; and
   generating, by the one or more processors, an optimal bending line recommendation that is optimized with respect to applications running on the display.

3. The method of claim 1, wherein the alert associated with the bending threshold comprises at least one of: visual feedback, audio feedback, and haptic feedback.

4. The method of claim 1, further comprising:
   receiving, by the one or more processors, a set of parameters associated with one or more obstacles in a display;
   comparing, by the one or more processors, the set of parameters associated with the one or more obstacles in the display to the set of historical bending data and the bending threshold of the display; and
   determining, by the one or more processors, one or more bends in the display, based at least in part, on a position of the one or more obstacles in the display.

5. The method of claim 1, further comprising:
   receiving, by the one or more processors, a request for information associated with a particular bend line within the display, prior to a bend occurring in the display.

6. The method of claim 1, wherein the plurality of data associated with the one or more bends in a display comprises: a location of the bend, a direction of the bend, a duration of the bend, a radius of the bend, and a frequency of the bend.

7. A computer program product comprising:
   a computer readable storage medium and program instructions stored on the computer readable storage medium, the program instructions comprising:
   program instructions to receive a plurality of data associated with one or more bends in a display;
   program instructions to compare the plurality of data associated with the one or more bends in the display to a set of historical bend data and a bending threshold of the display;
   program instructions to determine whether the one or more bends in the display have exceeded the bending threshold of the display;
   program instructions to, responsive to determining that the one or more bends in the display have exceeded the bending threshold of the display, send an alert associated with the bending threshold; and
   program instructions to determine an optimal bending line in the display alternative to a detected bend in the display based on applications running on the display and historical data, wherein:
      the optimal bending line is determined based on a comparison of an existing location of items associated with respective applications running on the display and the detected bend in the display such that the optimal bending line is alternative to the detected bend that conflicts with components of the displayed application running on the display, and
      wherein the historical data accounts for a direction, a bending radius, a duration of each bend line and a frequency of each bend line; and
   program instructions to, responsive to determining the optimal bending line in the display, indicate the optimal bending line in the display.

8. The computer program product of claim 7, wherein the program instructions to determine whether there is an optimal bending line in the display comprise:

program instructions to analyze the set of historical bend data, the bending threshold of the display, and a set of parameters associated with the bending line; and program instructions to generate an optimal bending line recommendation that is optimized with respect to applications running on the display.

9. The computer program product of claim 7, wherein the alert associated with the bending threshold comprises at least one of: visual feedback, audio feedback, and haptic feedback.

10. The computer program product of claim 7, further comprising:

program instructions to receive a set of parameters associated with one or more obstacles in the display;

program instructions to compare the set of parameters associated with the one or more obstacles in the display to the set of historical bending data and the bending threshold of the display; and program instructions to determine one or more bends in the display, based at least in part, on a position of the one or more obstacles in the display.

11. The computer program product of claim 7, further comprising:

program instructions to receive a request for information associated with a particular bend line within the display, prior to a bend occurring in the display.

12. The computer program product of claim 7, wherein the plurality of data associated with the one or more bends in a display comprises: a location of the bend, a direction of the bend, a duration of the bend, a radius of the bend, and a frequency of the bend.

13. A computer system comprising:

one or more computer processors;

one or more computer readable storage media;

program instructions stored on the one or more computer readable storage media for execution by at least one of the one or more processors, the program instructions comprising:

program instructions to receive a plurality of data associated with one or more bends in a display;

program instructions to compare the plurality of data associated with the one or more bends in the display to a set of historical bend data and a bending threshold of the display;

program instructions to determine whether the one or more bends in the display have exceeded the bending threshold of the display;

program instructions to, responsive to determining that the one or more bends in the display have exceeded the bending threshold of the display, send an alert associated with the bending threshold; and program instructions to determine an optimal bending line in the display alternative to a detected bend in the display based on applications running on the display and historical data, wherein:

the optimal bending line is determined based on a comparison of an existing location of items associated with respective applications running on the display and the detected bend in the display such that the optimal bending line is alternative to the detected bend that conflicts with components of the displayed application running on the display, and wherein the historical data accounts for a direction, a bending radius, a duration of each bend line and a frequency of each bend line; and program instructions to, responsive to determining the optimal bending line in the display, indicate the optimal bending line in the display.

14. The computer system of claim 13, wherein the program instructions to determine whether there is an optimal bending line in the display comprise:

program instructions to analyze the set of historical bend data, the bending threshold of the display, and a set of parameters associated with the bending line; and program instructions to generate an optimal bending line recommendation that is optimized with respect to applications running on the display.

15. The computer system of claim 13, further comprising:

program instructions to receive a set of parameters associated with one or more obstacles in the display;

program instructions to compare the set of parameters associated with the one or more obstacles in the display to the set of historical bending data and the bending threshold of the display; and program instructions to determine one or more bends in the display, based at least in part, on a position of the one or more obstacles in the display.

16. The computer system of claim 13, further comprising:

program instructions to receive a request for information associated with a particular bend line within the display, prior to a bend occurring in the display.

17. The computer system of claim 13, wherein the plurality of data associated with the one or more bends in a display comprises: a location of the bend, a direction of the bend, a duration of the bend, a radius of the bend, and a frequency of the bend.

* * * * *